(12) United States Patent
Shin

(10) Patent No.: US 9,791,765 B2
(45) Date of Patent: Oct. 17, 2017

(54) LIGHTING CONTROL DEVICE

(71) Applicant: Te-Fan Ho, Taipei (TW)

(72) Inventor: Nai-Chi Shin, Hsinchu (TW)

(73) Assignee: Te-Fan Ho, Taipei (TW)

( * ) Notice: Subject to any disclaimer, the term of this patent is extended or adjusted under 35 U.S.C. 154(b) by 241 days.

(21) Appl. No.: 14/733,574

(22) Filed: Jun. 8, 2015

(65) Prior Publication Data
US 2015/0370145 A1  Dec. 24, 2015

(30) Foreign Application Priority Data
Jun. 24, 2014 (TW) .............................. 103211145 U

(51) Int. Cl.
G03B 15/02 (2006.01)
G03B 15/06 (2006.01)

(52) U.S. Cl.
CPC ...... *G03B 15/06* (2013.01); *G03B 2215/0589* (2013.01)

(58) Field of Classification Search
CPC .......................... G03B 15/06; G03B 2215/0589
USPC ..................................................... 362/16, 85
See application file for complete search history.

(56) References Cited

U.S. PATENT DOCUMENTS

| | | | | |
|---|---|---|---|---|
| 3,919,543 A * | 11/1975 | Noren | ................. | F21S 48/2218 362/290 |
| 5,815,743 A * | 9/1998 | Ohmori | .............. | G03B 7/09979 396/61 |
| 6,883,946 B1 * | 4/2005 | Kolar | ...................... | F21V 11/06 362/290 |
| 7,517,113 B2 * | 4/2009 | Bruckner | ................ | F21V 11/06 362/279 |
| 7,722,201 B2 * | 5/2010 | Manger | .................. | G03B 15/02 362/16 |
| 9,004,704 B1 * | 4/2015 | Shum | ..................... | G03B 15/05 362/16 |
| 2007/0014563 A1 * | 1/2007 | Ferro | ...................... | F21V 11/06 396/199 |
| 2012/0063116 A1 * | 3/2012 | Baxter | .................. | F21V 29/673 362/6 |

FOREIGN PATENT DOCUMENTS

TW       M370758 U1   12/2009

* cited by examiner

*Primary Examiner* — Seung Lee
(74) *Attorney, Agent, or Firm* — Muncy, Geissler, Olds & Lowe, P.C.

(57) ABSTRACT

A lighting control device is mounted in a photoflash and comprises a fixing seat and a honeycomb grid installed in said fixing seat. The terminal of an extension of one end of the honeycomb grid has a first installation member, and the other end of the honeycomb grid has a honeycomb member. An annular region of the outer surface of the honeycomb member, which is adjacent to the first installation member, has a second installation member. In application, the first or second installation member is sleeved by the fixing seat to make the photoflash generate a desired lighted area according to requirement. Thereby, the present invention can change the distance between the honeycomb member and the photoflash and adjust the area lighted by the photoflash via varying the installation way of the honeycomb grid.

10 Claims, 7 Drawing Sheets

LIGHTING CONTROL DEVICE

This application claims priority for Taiwan patent application no. 103211145 filed on Jun. 24, 2014, the content of which is incorporated by reference in its entirely.

BACKGROUND OF THE INVENTION

Field of the Invention

The present invention relates to a photography lighting control device, particularly to a lighting control device able to regulate the lighted area according to requirement.

Description of the Related Art

In order to emphasize the subject (a person or an article) or create a special mood in photography, a lighting control device is usually arranged before a photoflash to generate a lighting condition the photographer desires. Thereby, the photographer can possess a perfect lighting quality to achieve desired moods in photographs of persons or articles no matter indoors or outdoors.

The honeycomb grid is one of lighting control devices, controlling the direction of the light beams emitted by a photoflash. The honeycomb grid can uniformly distribute the light beams of a photoflash, unlike a diffusing plate that scatters the light beams or a snoot that generates a hot spot. The honeycomb grid can make light beams distributed evenly in a specified direction, neither too widely nor too narrowly. Thereby, the subject (a person or an article) can be photographed in a perfect lighting condition.

While intending to vary the lighted area, the photographer has to change the honeycomb grid, which is inconvenient for the photographer. Further, the photographer has to carry about several types of honeycomb grids, which are hard to collect and carry about.

Accordingly, the present invention proposes a lighting control device to solve the abovementioned problems.

SUMMARY OF THE INVENTION

The primary objective of the present invention is to provide a lighting control device, wherein the way of installing the honeycomb grid is varied to adjust the distance between the honeycomb member and the photoflash and regulate the area lighted by the photoflash.

Another objective of the present invention is to provide a lighting control device, which is simple to operate, easy to collect, convenient to carry, and less likely to malfunction.

To achieve the abovementioned objectives, the present invention proposes a lighting control device, which comprises a fixing seat and a honeycomb grid, wherein the terminal of an extension of one end of the honeycomb grid has a first installation member; the other end of the honeycomb grid has a honeycomb member; an annular region of the outer surface of the honeycomb member, which is adjacent to the first installation member, has a second installation member; the user selects the first or second installation member to be sleeved by the fixing seat according to requirement. The second installation member is longer than the first installation member.

Below, embodiments are described in detail in cooperation with the attached drawings to make easily understood the structural characteristics and accomplishments of the present invention.

DETAILED DESCRIPTION OF THE INVENTION

Figure 1:
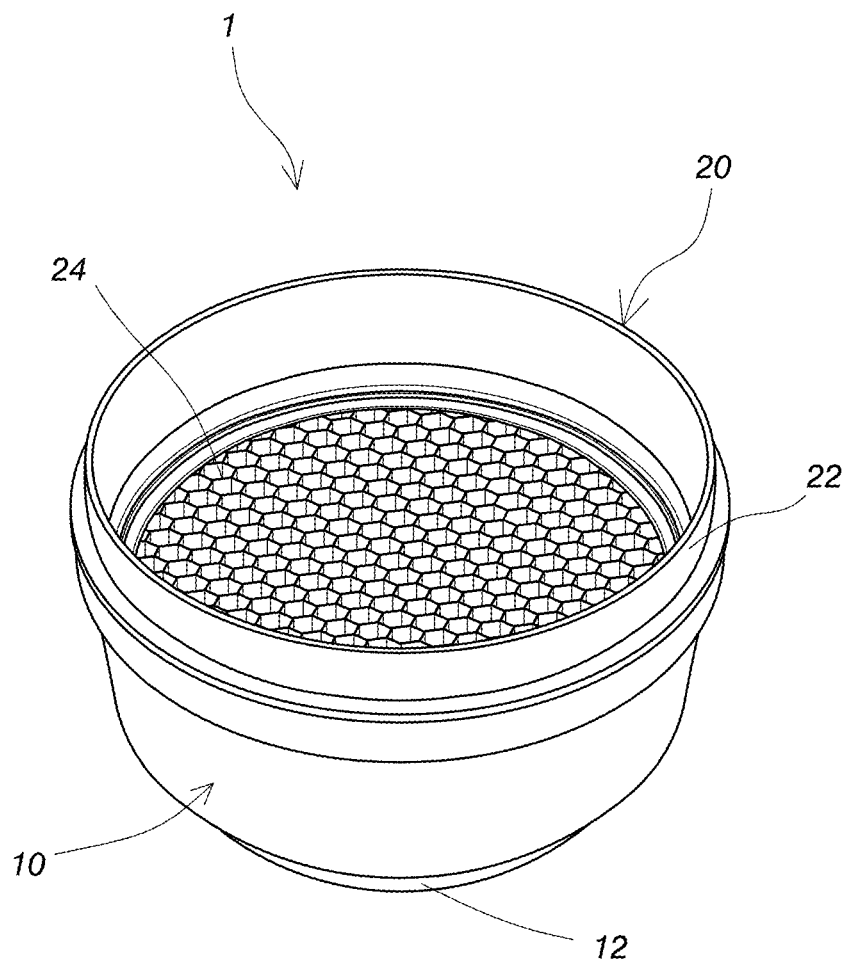
FIG. 1 is a perspective view schematically showing a lighting device according to a first embodiment of the present invention.
Figure 2:
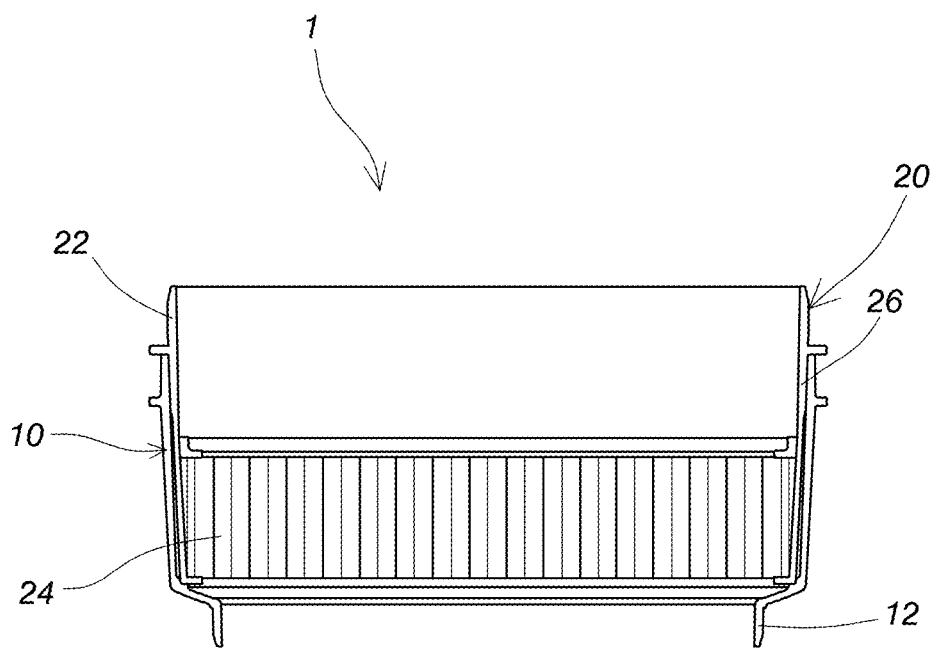
FIG. 2 is a sectional view schematically showing a lighting device according to the first embodiment of the present invention.
Figure 3:
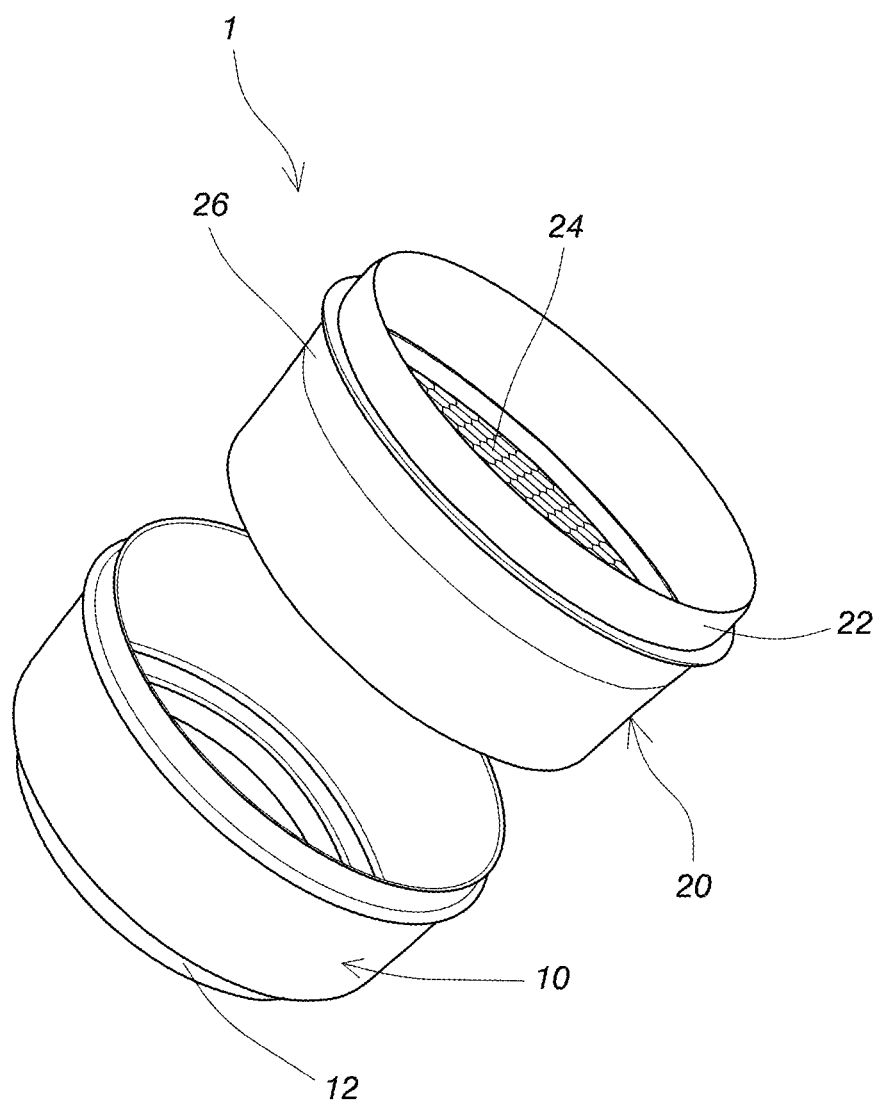
FIG. 3 is an exploded view schematically showing a lighting device according to a first embodiment of the present invention.

Refer to FIGS. 1-3 for a first embodiment of the present invention. The lighting control device 1 of the present invention comprises a fixing seat 10 and a honeycomb grid 20. In one embodiment, the fixing seat 10 is made of a plastic material. The fixing seat 10 is a cylindrical-shaped fixing seat. The outer rim of one end of the fixing seat 10 has a base-installation member 12 used to install the fixing seat 10 in a base (not shown in some drawings), and the base is further installed in a photoflash (not shown in some drawings). The honeycomb grid 20 is installed in another end of the fixing seat 10. The terminal of the extension of one end of the honeycomb grid 20 has a first installation member 22. Another end of the honeycomb grid 20 has a honeycomb member 24. In one embodiment, the honeycomb member 24 is made of a metallic material. An annular region of the outer surface of the honeycomb member 24, which is near the first installation member 22 has a second installation member 26 being longer than the first installation member 22. Thus, the first installation member 22 neighbors the second installation member 26. In application, the first installation member 22 or the second installation member 26 is sleeved by the fixing seat 10 according to requirement. In the first embodiment, the second installation member 26 is sleeved by the fixing seat 10. Thereby, the distance between the honeycomb member 24 and the photoflash is shorter, and the area lighted by the photoflash is larger.

Figure 4:
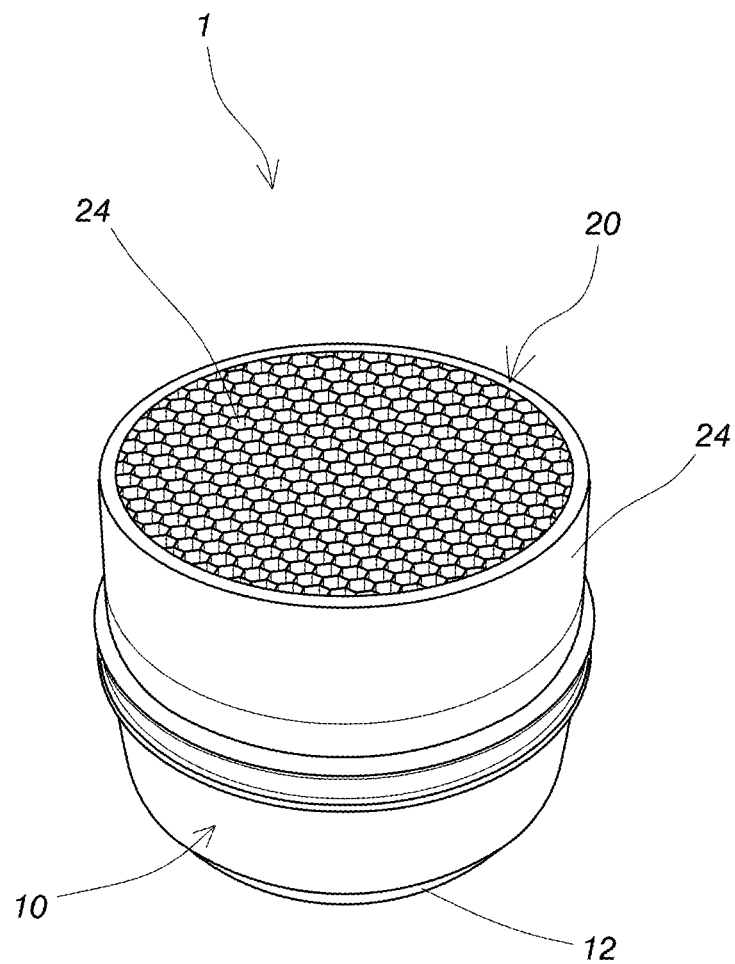
FIG. 4 is a perspective view schematically showing a lighting device according to a second embodiment of the present invention.
Figure 5:
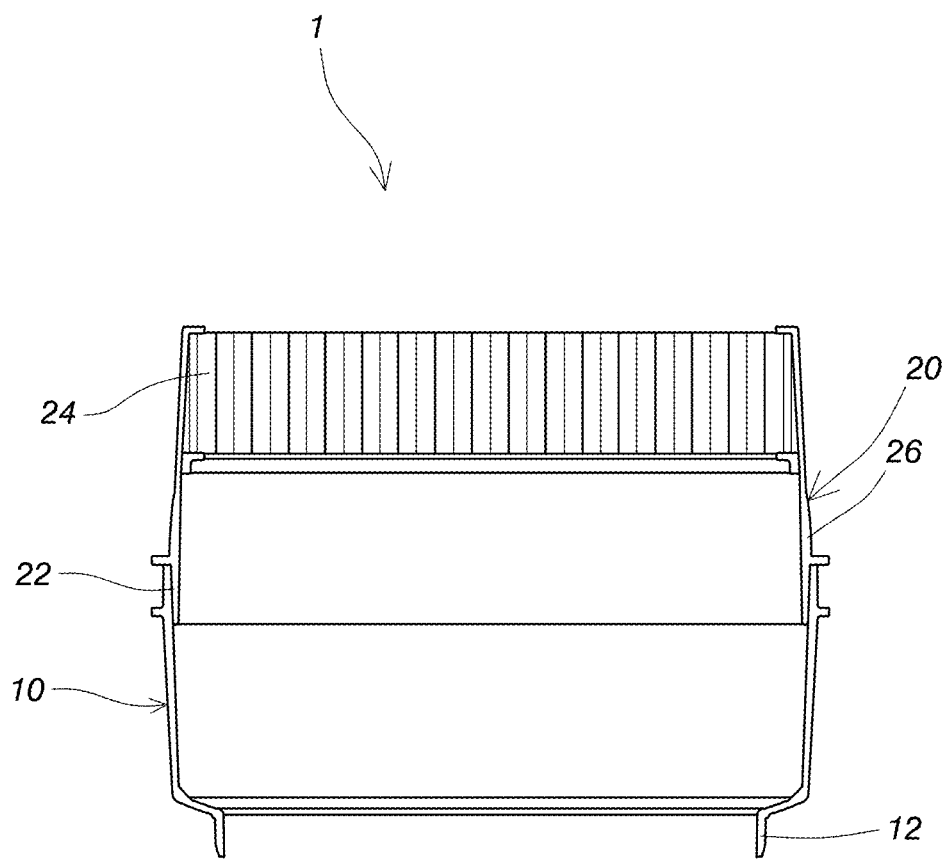
FIG. 5 is a sectional view schematically showing a lighting device according to the second embodiment of the present invention.

Refer to FIG. 4 and FIG. 5 for a second embodiment of the present invention. The second embodiment is identical to the first embodiment in structure but different from the first embodiment in that the first installation member 22 is sleeved by the fixing seat 10 to install the honeycomb grid 20 in the fixing seat 10. Thereby, the distance between the honeycomb member 24 and the honeycomb grid 20 is longer, and the area lighted by the photoflash is smaller.

Figure 6:
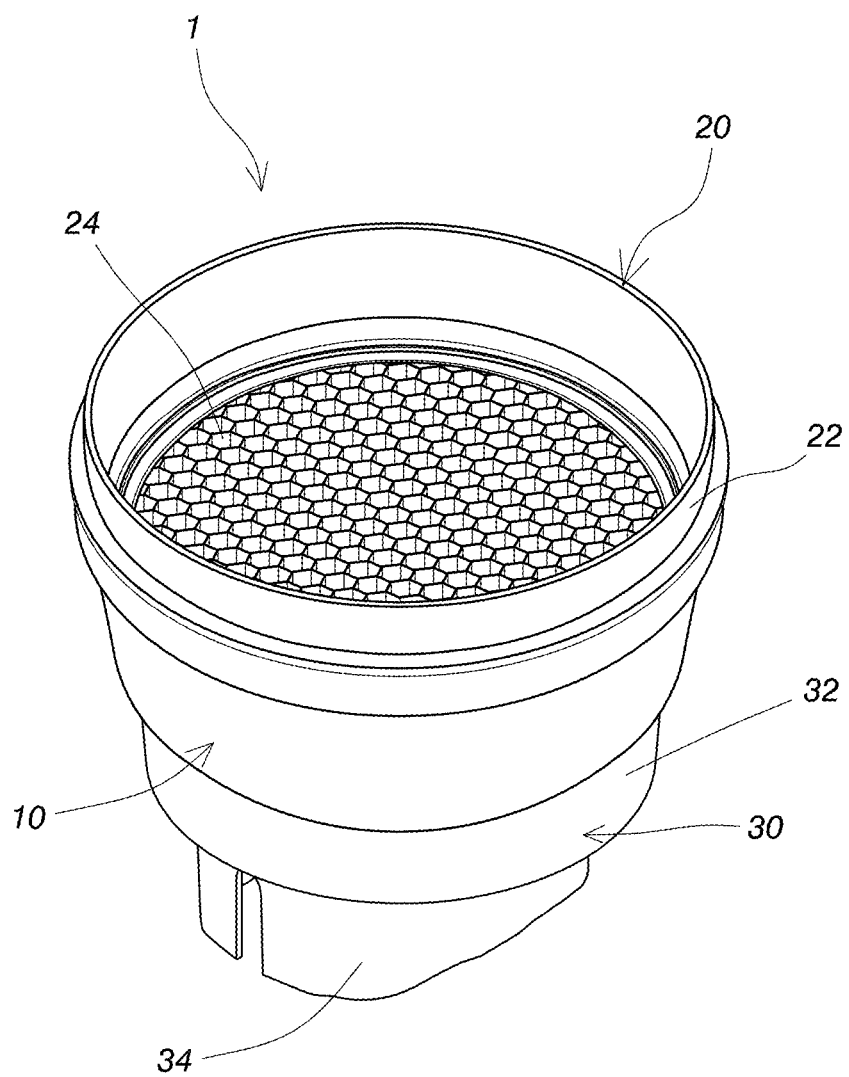
FIG. 6 is a perspective view schematically showing that a lighting device is installed in a base according to the first embodiment of the present invention.
Figure 7:
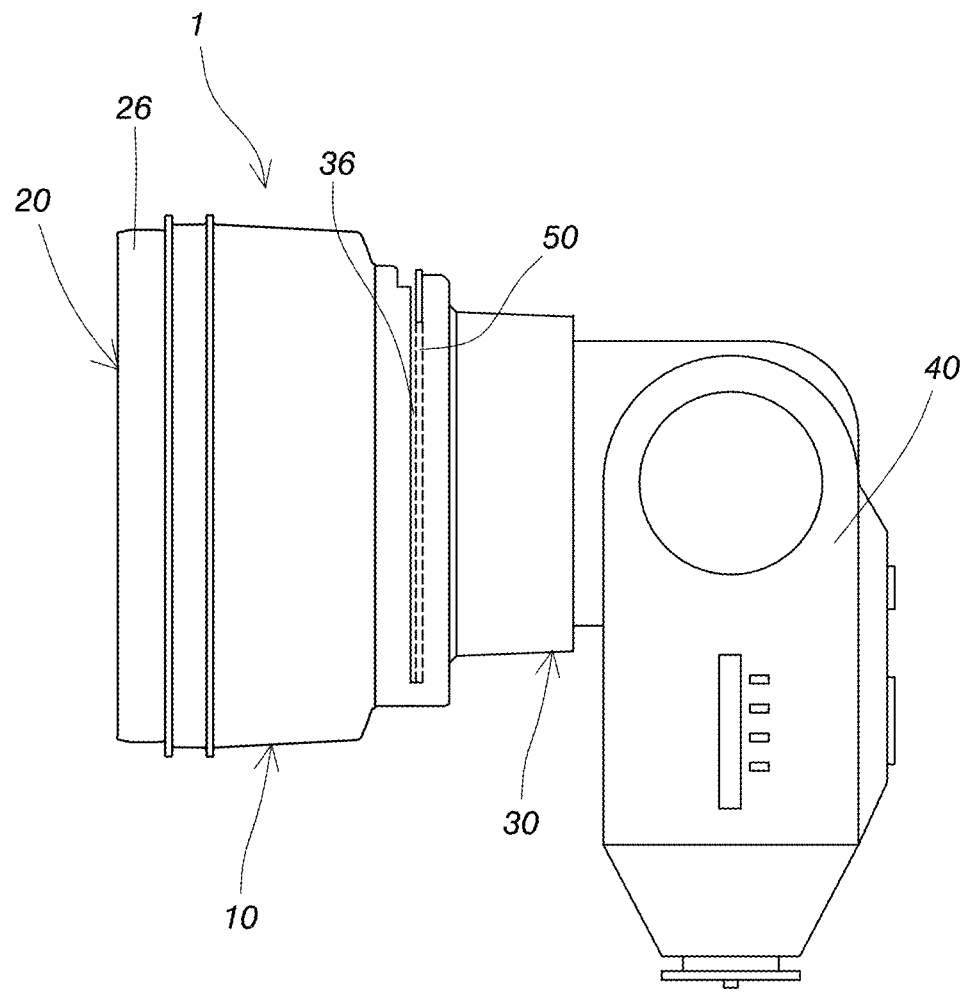
FIG. 7 is a side view schematically showing that a lighting device is mounted in a photoflash according to the first embodiment of the present invention.

Refer to FIG. 3, FIG. 6, and FIG. 7 for how the lighting control device 1 of the first embodiment is installed in a photoflash 40 through a base 30. No matter whether the first installation member 22 or the second installation member 26 is sleeved by the fixing seat 10, the fixing seat 10 is installed in the base 30 in the same way. Herein, the first embodiment where the second installation member 26 is installed in the fixing seat 10 is used to exemplify the installation of the lighting control device 1 to the base 30. In the embodiment shown in FIG. 3, FIG. 6 and FIG. 7, the combination of the fixing seat 10 and the honeycomb grid 20 is installed in the base 30 through the base-installation member 12 of the fixing seat 10. A fixing member 32 is annularly formed on and protruded from the surface of the base 30. The fixing member 32 directly sleeves the base-installation member 12 of the fixing seat 10, whereby the fixing seat 10 is installed in the fixing member 32 of the base 30 through the base-installation member 12. A mounting member 34 is extended from the lower surface of the base 30 and used to mount the base 30 in the photoflash 40. A light-pervious member 36 is arranged corresponding to the mounting member 34, allowing the light beams of the photoflash 40 to pass through. In one embodiment, a filter 50 is further disposed on the light-pervious member 36. The filter 50 is a color filter. Thereby, the light beams of the photoflash 40 are processed by the filter 50 to provide different lighting effects for the images. In the embodiment, the lighting control device 1 is installed in the base 30, and the base 30 is further mounted in the photoflash 40, whereby the honeycomb member 24 of the lighting control device 1 can control the light beams of the photoflash 40 and provide the photographer with the desired lighting effect.

In conclusion, the present invention varies the installation way of the honeycomb grid to change the distance between the honeycomb member and the photoflash and regulate the area lighted by the photoflash. The present invention is simple to operate, easy to collect, convenient to carry, and less likely to malfunction.

The embodiments described are only to exemplify the present invention but not to limit the scope of the present invention. Any equivalent modification or variation according to the characteristic or spirit of the present invention is to be also included within the scope of the present invention.

What is claimed is:

1. A lighting control device comprising
   a fixing seat; and
   a honeycomb grid, wherein a terminal of an extension of one end of said honeycomb grid has a first installation member, and another end of said honeycomb grid has a honeycomb member, and wherein an annular region of an outer surface of said honeycomb member, which is adjacent to said first installation member, has a second installation member, and wherein said first installation member or said second installation member is sleeved by said fixing seat; and
   wherein the second installation member is longer than the first installation member.

2. The lighting control device according to claim 1, wherein an outer rim of one end of said fixing seat has a base-installation member.

3. The lighting control device according to claim 1, wherein said fixing seat has cylindrical shape.

4. The lighting control device according to claim 1, wherein said honeycomb member is made of a metallic material.

5. The lighting control device according to claim 1, wherein said fixing seat is made of a plastic material.

6. The lighting control device according to claim 2 further comprising a base, wherein an fixing member is formed on an upper surface of said base, and wherein said fixing seat is installed in said fixing member through said base-installation member.

7. The lighting control device according to claim 6, wherein a mounting member is extended from a lower surface of said base, and wherein said base is mounted in a photoflash through said mounting member.

8. The lighting control device according to claim 7, wherein a light-pervious member is disposed in said base and corresponding to said mounting member, allowing light beams of said photoflash to pass through.

9. The lighting control device according to claim 8, wherein a filter is disposed on said light-pervious member.

10. The lighting control device according to claim 6, wherein said fixing member of said base is protruded from said upper surface of said base and sleeves said fixing seat.

* * * * *